United States Patent [19]
Pielkenrood

[11] 3,782,557
[45] Jan. 1, 1974

[54] SEPARATION DEVICE

[75] Inventor: Jacob Pielkenrood, Krommenie, Netherlands

[73] Assignee: Pielkenrood-Vinitex N.V., Assendelft, Netherlands

[22] Filed: July 26, 1971

[21] Appl. No.: 166,015

[30] Foreign Application Priority Data
July 26, 1970 Netherlands .................... 7011053

[52] U.S. Cl. ............................................. 210/521
[51] Int. Cl. ............................................. B01d 21/02
[58] Field of Search ............ 210/521, 522, 532–536

[56] References Cited
UNITED STATES PATENTS

| | | | |
|---|---|---|---|
| 3,482,694 | 12/1969 | Rice et al. | 210/522 |
| 3,529,728 | 9/1970 | Middelbeek et al. | 210/522 |
| 3,666,111 | 5/1972 | Pielkenrood et al. | 210/521 |
| 3,666,112 | 5/1972 | Pielkenrood et al. | 210/521 |

FOREIGN PATENTS OR APPLICATIONS

| | | | |
|---|---|---|---|
| 252,745 | 10/1948 | Switzerland | 210/521 |
| 994,118 | 11/1951 | France | 210/521 |

*Primary Examiner*—Charles N. Hart
*Attorney*—Smythe, Roston & Pavitt

[57] ABSTRACT

A device for separating precipitation and/or floatation components from a liquid by means of a separation assembly positioned in a basin at an angle in respect of the horizontal plane, and having a number of inclined separation passages, which basis is divided into a supply and a discharge chamber by means of a separate baffle which is sealed to the wall of the basin and to the upper end portion of the separation assembly, this baffle thus providing a complete isolation between said chamber, said baffle being positioned in such a manner that a pivoting movement or removal of said assembly for cleaning is not impeded, and unwanted accumulation of sediment on portions of this assembly is prevented.

10 Claims, 7 Drawing Figures

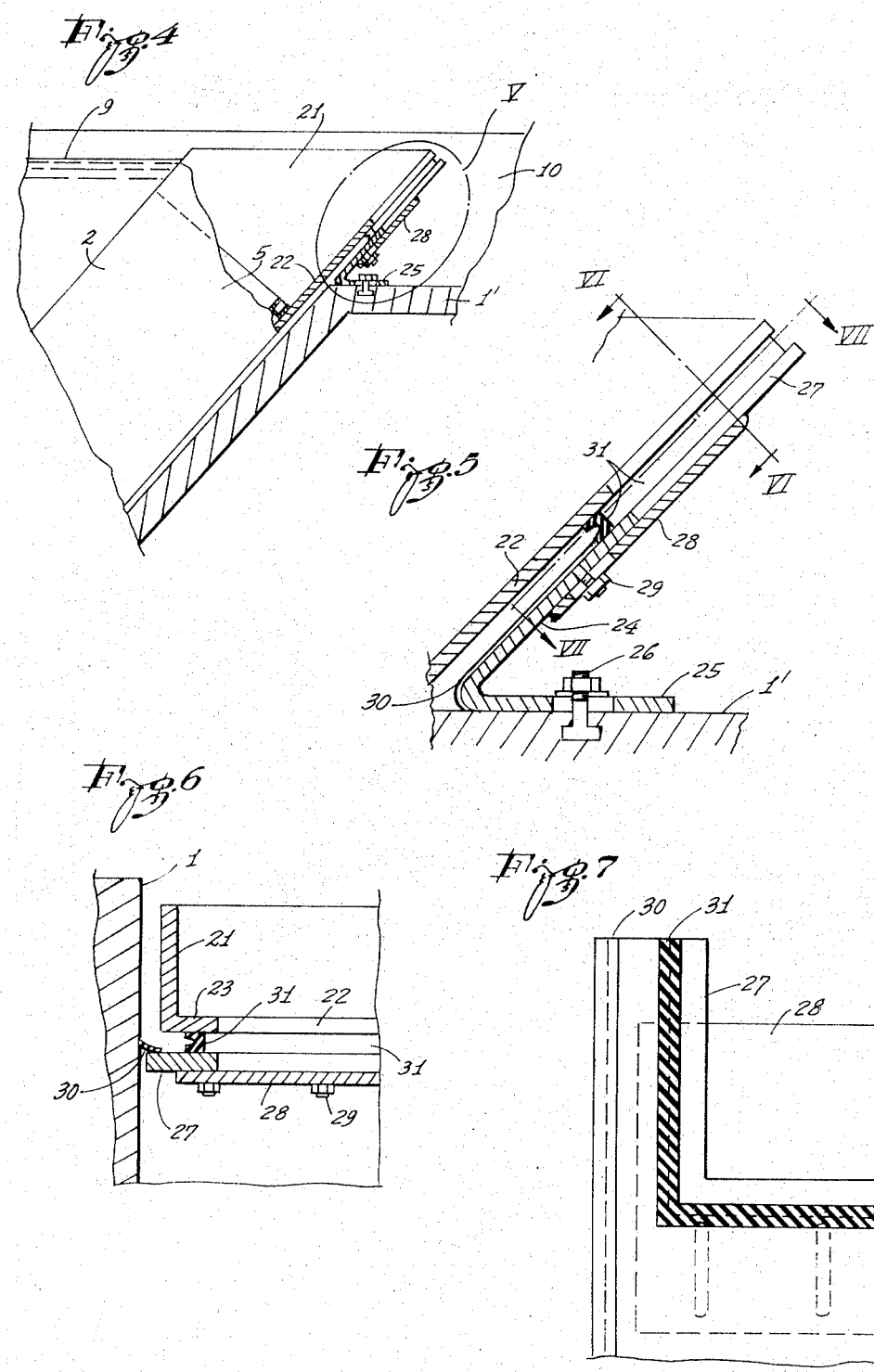

SEPARATION DEVICE

The invention relates to a device for separating precipitation and/or floatation components from a liquid.

Previously proposed such devices are described in U.S. Pat. No. 3,346,122 and French Pat. Spec. No. 982,912. These devices are not suitable, e.g., for the purification of drinking water, since complete isolation between supply and discharge chambers cannot be achieved. Further, while separation assemblies of the devices are constructed to be removable for cleaning purposes, in practice, such removal is often impossible because of the jamming or sucking action of sediment deposited between side walls of the assembly and adjoining side walls of the sump in which the assembly is mounted.

In British Pat. No. 1,253,674, there is described a separation device in which the separation assembly is pivotal for cleaning purposes. In this device also, the isolation between the supply and discharge chambers appears to be insufficient for many purposes, and the construction has the disadvantage that it is generally impossible to pivot the assembly sufficiently upwardly due to deposited sediment If one tries, then, to lift the assembly in another manner, the assembly is often seriously damaged since the traction forces necessary for overcoming the resistance of the sediment are larger than what may be supported by the assembly.

According to the present invention, there is provided a device for separating precipitation and/or floatation components from a liquid said device comprising a separation assembly positioned in a sump and having a number of inclined separation passages, the sump being divided into a supply and a discharge chamber by means of a separate baffle adjacent the upper end portion of the separation assembly, the separation assembly being supported at its lower side by a wall of the sump and being prevented from sliding downwardly, the baffle being sealed to the upper end portion of the separation assembly and side and bottom edges of the baffle being sealed to adjacent walls of the sump.

Preferably, the baffle is either in the form of a detachable plate bearing against the upper end face of the separation assembly by its own weight and having its lower edge retained by a stop on the adjacent wall of the sump thus allowing the baffle to be pivoted away from the assembly or in the form of a plate which is fixed at its lower edge portion to the adjacent wall of the sump, thus, forming, in effect, a continuation of an inclined supporting surface of the sump.

Embodiments of the invention will now be described, by way of example only, with reference to the accompanying diagrammatic drawings, in which:

FIG. 4 is a fragmentary section of the upper part of still another embodiment;

FIG. 5 is a section, to an enlarged scale of a portion V shown in FIG. 4;

FIG. 6 is a half-section taken on line VI—VI of FIG. 5; and

FIG. 7 is a half-section taken on line VII—VII of FIG. 5.

The invention will be particularly described with reference to devices for separating precipation components, although the invention can also be applied with the same effect to devices for separating floatation components in which the flow sense of the liquid in the separation assembly is oppositely directed, the overall structure of the device being substantially the same.

Figure 1:
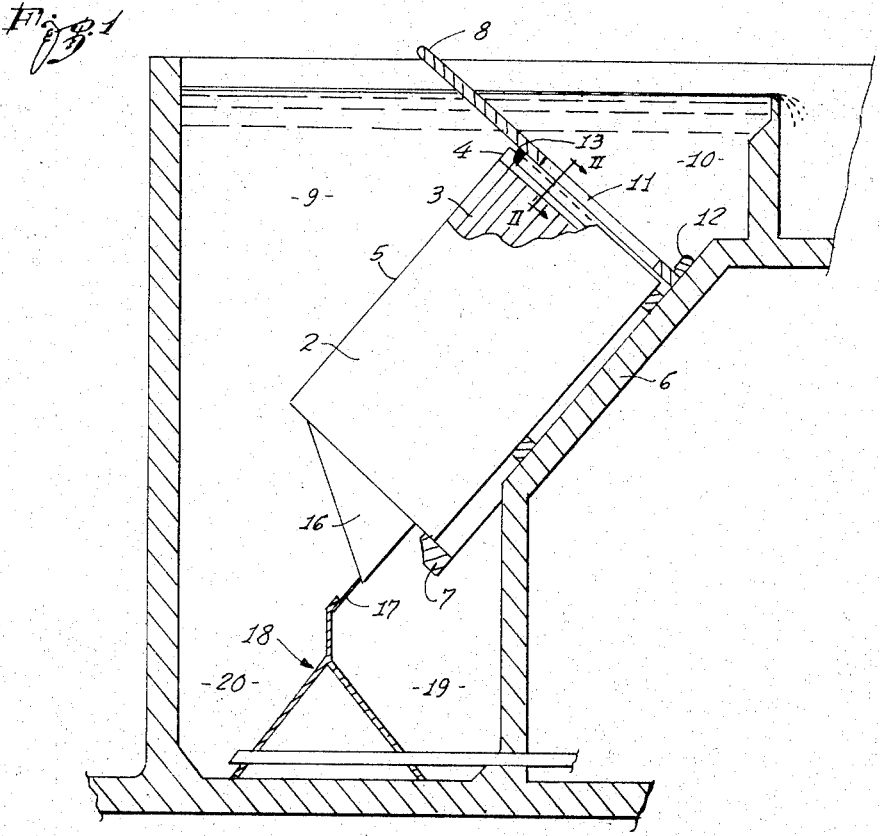
FIG. 1 is a section of one embodiment of a device according to the invention.

As shown in FIG. 1, a sump 1, for example made from concrete or iron, contains a separation assembly 2 which comprises, for example, a number of superposed corrugated plates 3, which are supported at one end in a frame consisting of channel bars 4. With the exception of both end faces, the assembly 2 is surrounded by a casing in the form of flat plates 5. The lower wall of the assembly 2 bears on an inclined wall portion 6 of the sump 1 either directly or by interposed supports. The lower transverse edge of the assembly 2 is prevented from sliding downwardly by a stop 7 on an extension of the wall 6 or of the supports provided on the wall 6, and this edge can pivot about the stop 7. The operation of such an assembly is described in the patent specifications referred to hereinbefore to which reference may be made.

The sump 1 is divided by means of a transverse partition 8 into a supply chamber 9 for the liquid to be treated, and a discharge chamber 10 for the treated liquid. The partition 8 is not a part of the sump 1, but is formed as a separate baffle having an aperture 11 adjacent the upper end face of the assembly 2. The lower edge of the baffle 8 bears on the wall 6 of the sump 1, and abuts a stop 12 which is fixed on the wall 6 in such a manner that the assembly 2 is substantially clamped between the stop 7 and the baffle 8. The baffle 8 bears on the assembly 2 by its own weight, and can be fixed in position by appropriate locking means at its upper side.

On the upper end face of the assembly 2, a continuous sealing strip 13 is provided, having, in the case shown, the form of a profiled strip of plastics or rubber engaged on a flange of the channel bars 4. It is also possible to clamp such a sealing strip in the channel of the bars 4 or to fasten it in another manner. The continuous strip contacts the part of the plate 8 surrounding the aperture 11 and provides, under the weight of the baffle 8, a complete seal between the assembly 2 and the baffle 8.

The baffle 8 is, furthermore, provided at its side edges, and if required also at its lower edge, with a sealing strip 14 which is, for example, glued or clamped on a surface of the baffle 8. The sealing strip 14 bears, as shown, against the adjacent wall of the sump 1, and provides a seal between the baffle 8 and this wall. The sealing strip 14 is resilient to enable the baffle to be readily pivoted around its lower support and to be removed from the sump when required.

The edges of the baffle 8 are, thus, sealed to the basin 1, and the casing of the assembly 2 is sealed to the baffle 8 around the aperture 11 so that complete isolation between the chambers 9 and 10 is obtained, with the exception of the flow passage desired through the interspaces between the plates 3 of the assembly 2.

Figure 2:
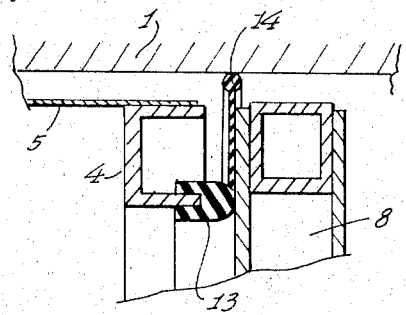
FIG. 2 is a fragmentary section, to an enlarged scale, taken on line II—II in FIG. 1.
Figure 3:
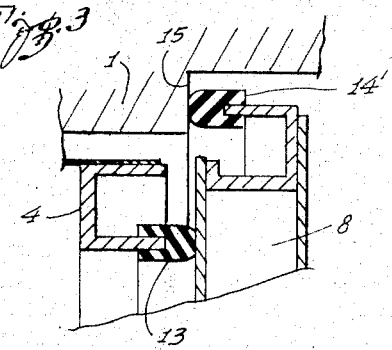
FIG. 3 is a section similar to FIG. 2 of another embodiment of the invention.

FIG. 3 shows another method of sealing the baffle 8 to the sump 1, in which transverse shoulders 15 are provided in the side walls of the sump 1, against which a sealing strip 14', having the same shape as the sealing strip 13, bears. The advantage thereof is that movement transversely to the side walls of the sump will not have any influence on the sealing effect as is likely to occur in the embodiment of FIG. 2. It is preferable to make the stop 7 adjustable in order to be able to make allowance for deviations in the length of the assembly 2.

When the assembly 2 is to be cleaned, the baffle 8 is tilted slightly forwardly, and then the assembly 2 is pivoted upwards about the stop 7. The sediment left on the plates 3 can then be removed easily by the influence of gravity and, if necessary, by means of water jets. Since the axis of pivotal movement is situated in the lower surface of the assembly 2, the baffle 8 will not hinder such movement. Since the seal between the upper end face of the assembly 2 and the baffle 8 is provided by the strip 13, the assembly 2 can be positioned in the sump 1 with sufficient clearance to avoid jamming by deposition of sediment between the assembly 2 and the walls of the sump 1.

The assembly 2 as shown, is provided at its lower end face with substantially vertically extending guide ducts as described in U.S. Pat. No. 3,666,111 (Pat. application Ser. No. 47,575, filed June 18, 1970) by Jacob Pielkenrood and Wilbur L. B. Ambrosius. The guide ducts as disclosed in that patent are bordered by guide partitions 16, alternate ducts engaging the crests of the plates 3 being closed at their lower side by a transvers plate 17 joining a partition 18 separating the supply chamber 9 from a collecting chamber 19 for the sediment issuing from the valleys of the plates 3 and conducted to the latter chamber by the other ducts between the partitions 16. Sediment already precipitating in the chamber 9 arrives in a separate collecting chamber 20. In order to enable unimpeded pivotal movement of the assembly 2, the transverse plates 17 bear, in the position shown, against a transverse lip 21 of the partition 18 to provide an adequate seal without hindering the pivotal movement.

It is possible to omit the upper wall, and, if desired, also the lower wall of the casing 5 of the assembly 2 if at least the upper or lower corrugated plate 3 respectively at the side of the upper end face is sealingly connected to the frame 4 so that no direct communication between the chambers 9 and 10 is possible. The sediment precipitating in the chamber 9 above the assembly 2 can then slide downwardly along the valleys of the upper plate.

Guide partitions 16, which extend through the aperture 11 of the baffle 8, can also be provided at the upper end face of the assembly; the assembly can nevertheless be pivoted upwardly if the baffle 8 is swung away over a sufficient angle.

It will be clear that many modifications are possible. For instance, the baffle 8 can be directed vertically and can engage the side walls of the assembly 2, using suitable sealing means. It is, furthermore, possible to provide sealing strips on the side walls and the bottom wall of the assembly 2, but this has the disadvantage that the pivoting movement of the assembly 2 will be hindered thereby. The embodiment as illustrated, is therefor, preferred. The baffle 8 can alternatively be fixed to the end face of the assembly 2, but the use of a separate baffle 8 has many advantages as to manufacture and installation.

Apart from the fact that the separate baffle 8 provides in a simple manner, complete separation between the supply and discharge chambers, an additional advantage is that the construction of the sump 1 is simplified, especially in the case of a sump of reinforced concrete, since integral partitions having apertures conforming to the shape of the separation assembly which would otherwise be necessary, can be omitted.

FIGS. 4 to 7 show a modification of the upper part of the device of FIG. 1. The side walls of the casing 5 of the assembly 2 are extended by triangular portions 21, the upper edges of which are, in the normal position shown, substantially horizontal and above the normal liquid level in the sump 1. Also the inner wall of the casing 5 is extended by an additional portion 22, the upper end portion of which is cut out to leave only two lateral flanges 23 which join the triangular portions 21. Instead of the baffle 8 of the previous embodiments separating the supply chamber 9 from the discharge chamber 10, a combined baffle and overflow weir 24 is provided, a lower flange 25 of which is adjustably secured by nuts 26 to the bottom wall 1' of the chamber 10. The upper end of the baffle/weir 24 is also cut out to leave lateral flanges 27. The cut out portion is substantially rectangular and can be adjustably closed by means of a weir plate 28 which is held in position on the baffle/weir 24 by means of clamping nuts 29 or the like. The flanges 27 extend, in the normal position, beneath and parallel to the corresponding lateral flanges 23 of the assembly 2.

In order to provide complete separation between the chambers 9 and 10, the baffle/weir 24 and its flanges 27 are provided with sealing strips 30 contacting the adjacent side wall of the sump 1 as shown in FIG. 6. The sealing strips 30 are made of a resilient material, preferably a foam plastic, providing a perfect liquid tight seal even in the case of an irregular surface, for instance, a concrete wall, thus, allowing dimensional variations over a relatively wide range which, in general, cannot be avoided when constructing sumps of this kind, particularly from concrete.

For providing the required isolation of the effluent of the assembly 2 from the liquid in the supply chamber 9, which is also present in the space between the casing 5 and the side walls of the sump 1, up to the baffle/weir 24, the baffle/weir 24 and its side flanges 27 are provided with a U-sectioned sealing strip 3 made of a resilient material, e.g., foam plastics, which strip contacts the portion 22 and its lateral flanges 23, and extends upwardly above the normal liquid level.

The capacity of the device can be regulated by means of the adjustable weir plate 28. When assembling the device, the baffle/weir 24 is adjusted so as to obtain the desired compression of the sealing strip 31 and is then secured by the nuts 26. The assembly 2 can be pivoted or completely removed and subsequently be returned to the position shown, the seal then being automatically restored.

It is also possible to combine the portion 22 and the baffle/weir 24, and to provide the casing 5 with lateral sealing rims contacting the adjacent walls of the sump. However, the pivotal movement and removal of the assembly 2 will be hindered by these rims which increase the friction, so that the embodiment as illustrated is preferred.

In the devices particularly described substantially complete isolation is provided between the supply and discharge chambers, and movement of the separation assembly for cleaning cannot be impeded by sediment or the like. Further, the construction of the sump is simplified.

The invention is not limited to the embodiments described above but all changes and modifications thereof not constituting departures from the spirit and scope of the invention are intended to be included.

I claim:

1. A device for separating precipitation and/or floatation components from a liquid having a sump with an inclined wall and sidewalls, further having a separation assembly with a number of inclined separation passages, and being supported by said inclined wall, between two adjacent sidewalls, the improvement comprising:

a baffle in the sump disposed adjacent the upper end of the separation assembly and dividing the sump into a supply and a discharge chamber, the baffle having an aperture and lying on and being sealed against the upper end face of the assembly around said aperture;

means for sealing the baffle against the sidewalls as well as against the inclined wall;

first stop means on said inclined wall and engaging the assembly for preventing it from sliding down, said assembly removably resting on said inclined wall; and second stop means engaging the lower edge of the baffle and preventing upward movement thereof.

2. A device according to claim 1, wherein the baffle is sealed to shoulders on the adjacent walls of the sump.

3. A device for separating precipitation and/or floatation components from a liquid having a sump with an inclined wall and sidewalls, further having a separation assembly with a number of inclined separation passages in a casing, and being disposed for support by said inclined wall and between two adjacent sidewalls, the improvement comprising:

the separation assembly with casing being removable from the sump;

baffle means in the sump disposed at the upper end of the separation assembly separated therefrom and from the sump and dividing the sump into a supply and a discharge chamber, and having a portion extending adjacent the bottom of the assembly at the upper end thereof and extending up to a level above the normal liquid level in the sump;

the baffle means having aperture with a hortizontally extending baffle edge above the bottom of the assembly at the upper end thereof;

means for sealing the baffle against the assembly, and including sealing means extending transversely to the hortizontally extending baffle edge;

additional means separated from the baffle as well as from said first baffle sealing means for sealing the baffle laterally against and alongside the walls;

further means for sealing the baffle relative to the inclined wall of said sump as regards supply and discharge chambers and extending parallel to the said baffle edge; and stop means engaging the assembly at the lower end for preventing said assembly from sliding down on said inclined wall of the sump.

4. A device according to any one of claim 3, wherein the separation assembly comprises, at least at its lower end, substantially vertically extending ducts interconnecting superposed crests or valleys of separation passages of the assembly, which ducts are closed by transverse plates joining, in the case of ducts communicating with crests, a partition wall separating the adjacent chamber from a collecting chamber for sediment communicating with the other ducts, the connection between the partition wall and the adjacent transverse plates or between two adjacent parts of the wall is such that removal of the separation assembly is not impeded.

5. A device according to claim 3, wherein the separation assembly has a casing with walls, said walls extending the normal liquid level in above the sump.

6. A device according to claim 5, a lower wall of the casing being provided with an aperture, an edge of the aperture being sealed to the baffle through interposed sealing strips serving as part of said transverse sealing means, the lateral sealing means being strips extending to above the normal liquid level in the sump.

7. A device for separating precipitation and/or floatation components from a liquid having a sump with an inclined wall and sidewalls, further having a separation assembly with a number of inclined separation passages, and being disposed for support by said inclined wall between two adjacent sidewalls, the improvement comprising:

a baffle mounted in the sump adjacent the inclined wall and constituting a continuation of the assembly but being separable therefrom, the baffle extending upwardly beyond said inclined wall and having side portions extending further beyond the normal liquid level in the sump;

the separation assembly having a casing with side walls and a lower wall provided with an aperture, the side walls of the casing extending above the normal liquid level in the sump;

an upper end of the baffle disposed for serving as an overflow weir, said side portions of the baffle extending beyond the weir;

strips for sealing the said side portions of the baffle against the side walls of the sump and extending above the normal liquid level in the sump; and sealing means for sealing the lower wall of the casing against the baffle and extending along the weir and one edge of the aperture, as well as for sealing along said side portions of the baffle, thereby sealing the assembly from the interior of the sump beyond said weir and opposite the assembly.

8. A device according to any one of claim 3 wherein the baffle is provided near its upper edge with an adjustable weir plate contacting side flanges of the baffle extending to above the normal liquid level in the sump and defining a substantially rectangular aperture, the latter being at least partially covered by the weir plate.

9. A device according to claim 7, wherein the lower edge portion of the baffle is fixed to an adjacent wall portion of the sump, adjacent also to said inclined wall.

10. A device as in claim 9, stop means provided for hingedly holding the lower end of the assembly for pivoting on an axis, said assembly resting removably on said inclined wall.

* * * * *